April 16, 1957     J. K. MAHR     2,789,175

FILTER CONDITION INDICATOR

Filed March 10, 1954

INVENTOR.
Jacob K. Mahr.
BY
Schmieding and Fultz
ATTORNEYS

2,789,175
FILTER CONDITION INDICATOR

Jacob K. Mahr, Sidney, Nebr.

Application March 10, 1954, Serial No. 415,291

6 Claims. (Cl. 200—81.9)

The present invention relates generally to heating and cooling systems and more particularly to an air filter apparatus for an air duct of such system.

In heating and cooling systems, it is common practice to provide a filter composed of porous, fibrous material through which the warm or cold air is passed for the purpose of removing dust and other foreign particles from the air which is circulated through the building. It is a characteristic of such filter to accumulate deposits of the material removed from the air with the result that the filter efficiency decreases with use. As the foreign particles accumulate in the interstices of the permeable filtering material, resistance to air flow, produced by the filter, increases, and the capacity of the filter to effectively filter the air is decreased. With systems presently in use, filters should be replaced after continual use renders them inefficient. As a practical matter, however, this important servicing is quite generally neglected since no means has heretofore been provided for indicating when the efficiency of a filter has decreased to the point where it should be replaced.

It is therefore an object of the present invention to provide, in a heating or cooling system for buildings, an apparatus for producing a signal to indicate that the efficiency of the filter for the system has decreased to the point where it should be changed.

It is a further object of the present invention to provide, in heating or cooling system for buildings, an apparatus of the type described which produces a signal responsive to a variation of resistance, by a filter, to the passage of air therethrough.

It is still another object of the present invention to provide, in a heating or cooling system for buildings, an apparatus for producing a signal indicating when the filter is in a condition to be changed, which apparatus is provided with means for adjusting the sensitivity of the signal producing means to the variation in filter condition such that the signal will be produced at any desired predetermined filter condition.

It is still another object of the present invention to provide, in a heating or cooling system for buildings, an apparatus of the type described which is simple in construction, inexpensive to produce, and adaptable to heating or cooling systems presently in use. For example, the present apparatus can readily be adapted to the filters used in conventional household furnaces.

Further objects and advantages of the present invention will be apparent from the following description, reference being had to the accompanying drawings wherein a preferred form of embodiment of the invention is clearly shown.

Figure 1:
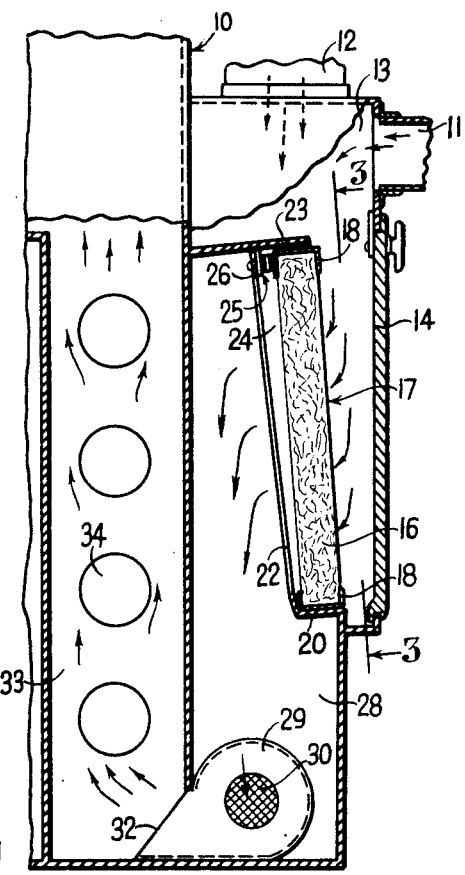
Figure 1 is a partial sectional view of a furnace showing the present apparatus installed therein, with the section being taken substantially along a vertical plane extending from the front to the rear of the furnace.

Referring to Figure 1 in the drawings, a household furnace is indicated generally at 10 and is provided with an air intake duct 11, for bringing in air from the exterior of the buildings. An air return duct 12 is also provided with both of the ducts 11 and 12 leading into a compartment 13. The compartment 13 is provided with a door 14 which provides access to a filter which is indicated generally at 17. The filter 17 includes a rigid peripheral frame 18 which retains a permeable filtering material 16. Filter 17 is retained by suitable frame means including a bottom member 20, side members 22, and a top member 23 formed with a flange member 26. A suitable switch, indicated generally at 25, is mounted to the flange 24 and disposed between such flange and the confronting surface of the filter frame 18.

Figure 4:
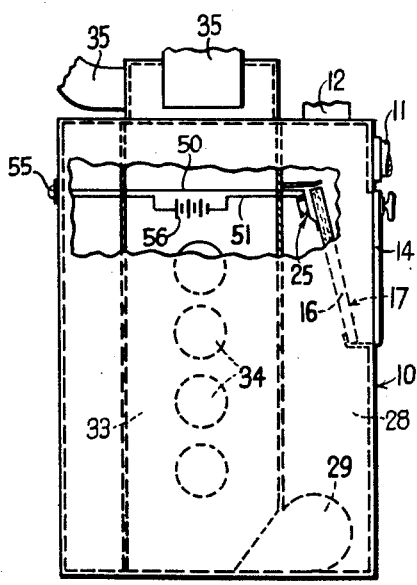
Figure 4 is a side elevational view, partially broken, of a household furnace, with such view showing the relationship of the present apparatus to the overall furnace structure.

The furnace 10 further includes a compartment 28 which is located downstream from the filter in a flow of air. A blower 29 is shown mounted in the lower portion of compartment 28 with such blower having an air intake 30, and an air discharge opening 32 for discharging air into compartment 33. Hence it is seen that blower 29 serves to draw air from the conduits 11 and 12, into compartment 13, and next through the filter 17 and into compartment 28. The filtered air is then driven upwardly through compartment 33 where such air is heated by the heating elements 34. After the air passes over the heating elements 34, it is forced out of the heating compartment 33 and distributed to various portions of the buildings by means of conduit 35 of Figure 4.

Figure 2:
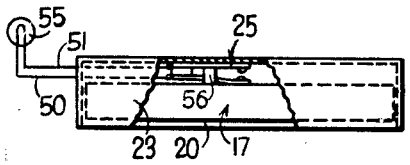
Figure 2 is a top plan view of a filter and the mounting frame showing the present invention applied thereto.
Figure 3:
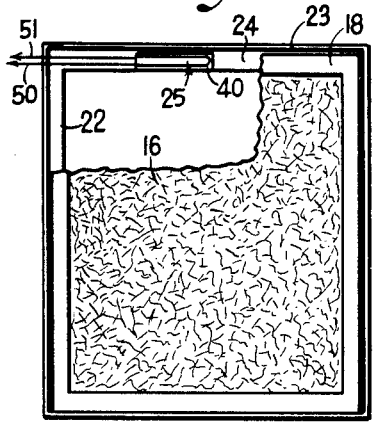
Figure 3 is a partially broken front elevational view corresponding to Figure 2, with such view being taken substantially along the line 3—3 of Figure 1.

Referring next to Figure 3, it will be seen that the switching means 25, previously mentioned, is secured to the face of the flange 24 of the filter frame. Switching means 25 can be secured to the flange in any suitable manner; adhesive has been found suitable for this purpose. It is also satisfactory to provide the dielectric base 40, of the switch 25, with a suitable adhesive coating which can be made available immediately prior to use by peeling off a protective backing strip. When the filter frame 18 is in its normal disposition it rests against the switching means 25 and the force exerted by the air upon the filter urges the filter frame 18 against the switching means 25.

Figure 5:
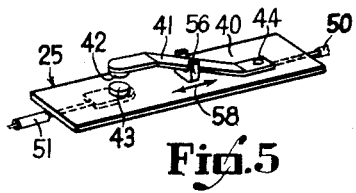
Figure 5 is a perspective view showing a suitable switching means as utilized in the present invention.

Referring next to Figure 5, the switching means 25 of the present invention is illustrated in enlarged relationship. Such means is formed with a dielectric base 40. A leaf spring 41 is secured to the upper surface of the base 40 by means of a fastener 44. Leaf spring 41 is provided with a contact point 42, which is engageable with but normally spaced from a second point 43. The leaf spring 41 serves as a conductor between the contact 42 and a wire 50. A second wire 51 is secured to contact point 43, and wires 50 and 51 lead to a signal 55. A source of electrical energy is provided in the circuit in the manner indicated at 56 in Figure 4. It will be understood that the signal 55 can be in the form of a light, or an audible signal such as a buzzer, or any other suitable form.

Referring to Figure 5, a U-shaped adjusting block 56 is retained between the leaf spring and the dielectric base 40, with such block being adjustably slideable as indicated by the arrow 58 in Figure 5. By moving the U-shaped block 56 to a position closer to the fastener 44, more force will be required to bring the contact point 42 into engagement with the contact point 43 upon yielding of the filter 17 toward flange 24 responsive to the force of the flowing air. By moving the U-shaped block away from the fastener 44, less force will be required to bring the contact point 42 into engagement with the contact point 43. It is therefore seen that the switching means 25 can be readily provided with the desired amount of sensitivity for the particular size and characteristics of the filter with which it would be used, or for the particular filter condition at which operation of the signal 55 is desired.

It will be understood that the switching means 25 can be readily mounted to the peripheral frame 18 of the filter 17, instead of to the flange 24 as illustrated in the figures. Hence the manufacturer of the filter could attach switching means as part of the manufacturing operation. Suitable detachable connections would then be provided so that the switching means need only have short wires attached thereto which would be readily connected with the long lead wires running to a signal mounted on the furnace for air conditioning systems. In such instances, the switching means would be supplied by the filter manufacturer, and it would necessarily be simple and inexpensive, as in the present illustrated form, so that it could be disposed of along with the filter.

The U-shaped block 56, shown in Figure 5, may be formed with a U-shaped slot in frictional gripping relationship with the leaf spring 41 to provide a snug sliding fit whereby the block will be frictionally retained in various positions of adjustment.

In operation, it will be seen that air flowing into the compartment 13 from the exterior of the building, and from the return duct, is passed through the filter 17. Foreign material in the air is retained in the interstices of the permeable filtering material, and, as the interstices become progressively filled, the amount of resistance, which the filter 17 offers to the flow of air, progressively increases. As the filter resistance increases, the filter will overcome the spring action of the leaf spring 41, which spring serves to normally maintain an unclogged filter in the position of Figure 1 wherein the filter is spaced from the face of flange 24 on the upper mounting member 23. As the total force exerted on the filter 17, by the air flow increases, the contact points are progressively brought closer together until contact is eventually effected, at which time a signal is produced at the signal means 55. The attendant is thereby notified that the filter shoud be changed. Door 14 of compartment 13 is then opened and the filter 17 is removed and replaced with a new unit.

In summary, it will be seen that the present invention possesses high utility. Its application to the heating or cooling system for buildings prevents the operation of such system at low degrees of efficiency. It will be appreciated that if the circulation of air is allowed to become excessively impaired by a heavily clogged filter, the volume of hot or cold air discharged to the building is decreased, and excessive loads are placed on the blower means serving to circulate the air. The present invention, however, provides means for avoiding operation of the heating or cooling system under conditions where the system is no longer efficiently removing dust and foreign particles from the air.

While the form of embodiment of the present invention as herein disclosed constitutes a preferred form, it is to be understood that other forms might be adopted, all coming within the scope of the claims which follow:

I claim:

1. A switching means for a filter condition indicating apparatus for a filtering system wherein a filter means is carried by a mounting means in a fluid conduit, said switching means comprising retaining means moveably retaining said filter means relative to said mounting means whereby increased resistance to fluid flow by said filter means produces relative movement between said filter means and mounting means, and contact means including a pair of contacts, said contact means operatively engaging said filter means whereby movement of said filter means actuates said contact means.

2. A switching means for a filter condition indicating apparatus for a filtering system wherein a filter means is carried by a mounting means in a fluid conduit, said switching means comprising retaining means moveably retaining said filter means relative to said mounting means whereby increased resistance to fluid flow by said filter means produces relative movement between said filter means and mounting means, and contact means including a pair of contacts, said contact means operatively interposed between said mounting means and said filter means whereby movement of said filter means actuates said contact means.

3. A switching means for a filter condition indicating apparatus for a filtering system wherein a filter means is carried by a mounting means in a fluid conduit, said switching means comprising retaining means moveably retaining said filter means relative to said mounting means whereby increased resistance to fluid flow by said filter means produces relative movement between said filter means mounting means, and contact means including a pair of contacts, said contact means operatively engaging said filter means whereby movement of said filter means actuates said contact means, and means for adjusting the yieldability of said retaining means to vary the yieldability of said filter means responsive to force exerted by fluid passing through said filter means.

4. A switch for a filter condition indicating apparatus for a filtering system wherein a filter means is carried by a mounting means in a fluid conduit, said apparatus comprising a yieldable means mounted on one of said means and extending to engage the other of said means to yieldingly oppose movement of said filter means by the force of fluid passing through said filter means, a contact carried by one of said means, and a second contact carried by another of said means and adapted to engage said first contact.

5. A switch for a filter condition indicating apparatus for a filtering system wherein a filter means is carried by a mounting means in a fluid conduit, said apparatus comprising a yieldable means mounted on one of said means and angularly extended between confronting surfaces on said two first mentioned means to yieldingly oppose movement of said filter means by the force of fluid passing through said filter means, a contact carried by one of said means, a second contact carried by another of said means and adapted to engage said first contact, and wedging means moveably interposed between said yieldable means and another of said means for adjusting the yieldability of said filter means to force exerted by fluid passing through said filter means.

6. A filter condition indicating apparatus for a filtering system wherein a filter means is carried by a mounting means in a fluid conduit, said apparatus comprising a base engaging one of said two first mentioned means, a contact member mounted on said base and extended to engage the other of said two first mentioned means, and a second contact member mounted on said base and positioned to engage said first contact member.

References Cited in the file of this patent

UNITED STATES PATENTS

| 2,214,092 | Uhlhorn | Sept. 10, 1940 |
| 2,320,368 | Leathers | June 1, 1943 |
| 2,523,967 | Nystue | Sept. 26, 1950 |